(12) United States Patent
Jessup et al.

(10) Patent No.: US 7,680,682 B2
(45) Date of Patent: Mar. 16, 2010

(54) METHOD, SYSTEM AND PROGRAM PRODUCT FOR ASSESSING A PRODUCT DEVELOPMENT PROJECT EMPLOYING A COMPUTER-IMPLEMENTED EVALUATION TOOL

(75) Inventors: Carol B. Jessup, Philadelphia, PA (US); Stephen C. Moore, Chesterfield, VA (US); Gino Palozzi, Westerville, OH (US); Pawel A. Stefanski, Falls Church, VA (US); Stephen D. Trisko, Palatine, IL (US); Lawrence E. Wilkie, Louisville, KY (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 10/799,542

(22) Filed: Mar. 11, 2004

(65) Prior Publication Data

US 2005/0203786 A1 Sep. 15, 2005

(51) Int. Cl.
*G06F 17/18* (2006.01)
(52) U.S. Cl. .............................. 705/7; 705/11
(58) Field of Classification Search ............. 705/7, 705/10
See application file for complete search history.

(56) References Cited

U.S. PATENT DOCUMENTS

| | | | | |
|---|---|---|---|---|
| 6,604,084 | B1 | 8/2003 | Powers et al. ............... | 705/11 |
| 2002/0138406 | A1* | 9/2002 | Elgabry ....................... | 705/38 |
| 2002/0165752 | A1* | 11/2002 | Miller .......................... | 705/8 |
| 2003/0083912 | A1 | 5/2003 | Covington, III et al. ........ | 705/7 |
| 2003/0110067 | A1 | 6/2003 | Miller et al. ................... | 705/8 |
| 2003/0115207 | A1 | 6/2003 | Bowman et al. ............. | 707/100 |
| 2003/0130975 | A1 | 7/2003 | Muller ......................... | 706/50 |
| 2003/0135399 | A1 | 7/2003 | Ahamparam et al. ........... | 705/7 |
| 2003/0149613 | A1 | 8/2003 | Cohen et al. .................. | 705/11 |
| 2004/0138944 | A1* | 7/2004 | Whitacre et al. .............. | 705/11 |

OTHER PUBLICATIONS

Litt, The Many Faces of Troubleshooting and Problem Solving, Troubleshooting Professional Magazine, Dec 2000, p. 1-48.*

(Continued)

*Primary Examiner*—Beth V Boswell
*Assistant Examiner*—Justin M Pats
(74) *Attorney, Agent, or Firm*—John R. Pivnichny; Kevin P. Radigan, Esq.; Heslin Rothenberg Farley & Mesiti P.C.

(57) ABSTRACT

A product development project assessment approach is provided which includes identifying multiple possible root causes of trouble for a product development project, identifying question sets related to the multiple possible root causes of trouble, and providing a computer-implemented tool to evaluate answers to the question sets and provide guidance regarding existence of one or more root causes of trouble for the product development project. The assessment approach further includes evaluating project management processes employed for the product development project by comparison thereof to identified, standard project management processes, and provide guidance regarding effectiveness of implementation of the project management processes employed. Product management work product is also evaluated as further evidence of the existence of one or more root causes of trouble or the effectiveness of implementation of the project management processes. The product development project can comprise a software or hardware development project.

14 Claims, 20 Drawing Sheets

| | 1.1 PEOPLE RESOURCES | IMPACT TOTAL | STRENGTH OF EVIDENCE |
|---|---|---|---|
| 1.1.1 | DIFFICULT TO ACQUIRE SKILLED/TRINED RESOURCES FOR THE PROJECT | -5 | 4 |
| 1.1.2 | INEFFECTIVE OR UNCLEAR PROJECT ORGANIZATION AND ROLES | -2 | 3 |
| 1.1.3 | UNPLANNED TURNOVER OF KEY PROJECT TEAM MEMBERS | 0 | 0 |
| 1.1.4 | FAILURE OF KEY SUBCONTRACTOR TO DELIVER | -6 | 5 |
| 1.1.5 | POORLEY CONSTRUCTED OR UNAUTHORIZED SUBCONTRACTS | 0 | 0 |
| 1.1.6 | UNDERMINED MOTIVATION | 0 | 0 |
| 1.1.7 | WEAK/PROBLEM PERSONNEL | 0 | 0 |
| 1.1.8 | UNCONTROLLED PROBLEM EMPLOYEES | 0 | 0 |
| 1.1.9 | HEROICS | -3 | 3 |
| 1.1.10 | ADDING PEOPLE LATE | 0 | 0 |
| 1.1.11 | NOISY, CROWDED OFFICE | 0 | 0 |
| 1.1.12 | FRICTION BETWEEN DEVELOPERS AND CLIENT | -3 | 2 |
| 1.1.13 | UNREALISITIC EXPECTATIONS | -6 | 3 |
| 1.1.14 | LACK OF EFFECTIFE PROJECT SPONSORSHIP | 0 | 0 |
| 1.1.15 | LACK OF STAKEHOLDER BUY-IN | 0 | 3 |
| 1.1.16 | LACK OF USER INPUT | -2 | 3 |
| 1.1.17 | POLITICS PLACED OVER SUBSTANDE | 0 | 0 |
| 1.1.18 | WISHFUL THINKING | -6 | 4 |

OTHER PUBLICATIONS

Whitacre et al., Provisional Application, Jul. 22, 2002, p. 1-76.*
Lange et al., Potential Failure Mode Effects and Analysis, Chrysler, Ford, and General Motors, 2001, p. 1-90.*
Haimes et al., Risk Filtering, Ranking, and management Framework Using Hierarchical Holographic Mapping, Risk Analysis, vol. 22, No. 2, 2002, p. 383-97.*
Engert and Lansdowne, Risk Matrix User's Guide, Version 2.2, Nov. 1999, p. 1-44.*

"Project Magic", IBM Research Disclosure, No. 438142, Oct. 2000, pp. 1850-1851.
McConnell, Steve, "Code Complete", Microsoft Press, 1993, pp. 573-582.
McConnell, Steve, "Rapid Development", Microsoft Press, 1993, pp. 39-50.

* cited by examiner

| | |
|---|---|
| 1 | DIFFICULT TO ACQUIRE SKILLED/TRAINED RESOURCES FOR THE PROJECT |
| 1.1 | IS IT NECESSARY FOR EACH TEAM MEMBER TO BE A "TOP PERFORMER"? |
| 1.2 | HOW DO YOU KNOW WHEN YOU WILL NEED SPECIFIC SKILLS? |
| 1.3 | HOW DO YOU EXPAND YOUR SKILLED RESOURCE SEARCH TO SUBCONTRACTORS? |

{ 129 (rows 1.1–1.3)

fig. 2A

WORK PRODUCT ASSESSMENT: ISSUE DOCUMENT

| ASSESSMENT RATING(1-5) | | 2 | | | |
|---|---|---|---|---|---|
| 3.1.4 ISSUE DOCUMENT | | CLIENT EQUIVALENT PRODUCT NAME: | | | ABCD.xls |
| WPPM FIELD NAME | DESCRIPTION | FIELDS (Y/N) | VALUE OF FIELD | EQUIVALENT FIELD NAME | NOTES |
| ISSUE SUMMARY | | | | | |
| ISSUE IDENTIFIER | | N | REQUIRED | | |
| SHORT DESCRIPTION | AN ABBREVIATED DESCRIPTION. IF POSSIBLE, USE KEYWORDS THAT CAN QUICKLY DIFFERENTIATE IT FROM OTHER ISSUES. | N | REQUIRED | | |
| PRIORITY | HIGH,MEDIUM,LOW,FOR EXAMPLE | N | REQUIRED | | |
| DATE RAISED | | N | REQUIRED | | |
| STATUS | OPEN, ANALYZED,ESCALATED, CLOSED,FOR EXAMPLE | Y | REQUIRED | | | fig. 3A

WORK PRODUCT ASSESSMENT: ISSUE DOCUMENT (CONTINUED)

| ISSUE DESCRIPTION | | | | | |
|---|---|---|---|---|---|
| DESCRIPTION OF THE ISSUE | A COMPLETE AND DETAILED DESCRIPTION OF THE ISSUE. SYMPTOMS AND FACTS THAT ARE CAUSING CONCERN | Y | REQUIRED | | |
| ISSUE TYPE | TYPES ARE DEFINED BY THE PROJECT BASED ON ITS SPECIFIC NEEDS FOR GATHERING STATISTICS AND RETRIEVAL OF THE INFORMATION. REPRESENTATIVE TYPES ARE "ISSUE INVOLVING THE SPONSOR," "ISSUE INVOLVING THE PROJECT TECHNICAL ENVIROMENT," "ISSUE DEALING WITH FEATURE" | N | REQUIRED | | |
| ROOT CAUSE | THE PRIMARY CAUSE OF THE ISSUE. IDENTIFYING THE CAUSE IS REQUIRED FOR DEFINING THE RESOLUTION | N | REQUIRED | | |
| RAISED BY | THE NAME OF THE PERSON WHO RAISED THE ISSUE | N | REQUIRED | | |
| ISSUE CONSEQUENCES | DESCRIPTION OF THE IMPACT THE ISSUE IS HAVING OR IS LIKELY TO HAVE ON THE PROJECT AND THE OPTIMAL TIME FRAME FOR RESOLUTION | N | REQUIRED | | |

*fig. 3A'*

WORK PRODUCT ASSESSMENT: ISSUE DOCUMENT (CONTINUED)

| | | | | | |
|---|---|---|---|---|---|
| RESOLUTION | DESCRIPTION OF THE ACTIVITIES NEEDED OR THAT HAVE BEEN PERFORMED TO RESOLVE THE ISSUE. THE DESCRIPTION OF THE RESOLUTION MAY ALSO BE FOUND VIA THE LINKS TO OTHER DOCUMENTS. | N | REQUIRED | | |
| TARGET DATE | THE PLANNED DATE FOR ISSUE RESOLUTION | N | REQUIRED | | |
| OWNER | NAME AND ROLE OF THE PERSON RESPONSIBLE FOR RESOLVING THE ISSUE | N | REQUIRED | | |
| RELATED ACTIONS | LIST THE ACTIONS REQUIRED TO THE ISSUE. REFERENCE ANY ACTION CONTROL DOCUMENTS RELATED TO THIS ISSUE | | REQUIRED | | |
| ISSUE HISTORY | ADDITIONAL COMMENTS AS NEEDED TO TRACE THE ISSUE AND RESOLUTION OF THE ISSUE. | N | REQUIRED | | |
| TOTAL REQUIRED FIELDS | | 2 | 15 | | |

| | | SCORING |
|---|---|---|
| REQUIRED FIELD PERCENTAGE | 13% | 2 |
| DATA CURRENCY (Y/N) | Y | 10 |
| DATA FREQUENCY (Y/N) | N | 0 |
| DATA QUALITY (0-10) | 5 | 5 |
| DOCUMENT EXISTS (Y/N) | Y | 10 |
| ASSESSMENT | | 2 |

*fig. 3A"*

WORK PRODUCT ASSESSMENT: WORKSHEET SUMMARY

| ID | WORK PRODUCT | DESCRIPTION | PURPOSE | DOCUMENTATION | ASSESSMENT |
|---|---|---|---|---|---|
| 3.1.1 | DELIVERABLE DEFINITION | A DELIVERABLE DEFINITION PROVIDES A DESCRIPTION OF A DELIVERABLE AND ITS COMPONENTS, AS WELL AS THE ASSOCIATED DELIVERY AND ACCEPTANCE CONDITIONS. A DELIVERABLE DEFINITION ALSO PROVIDES THE STATUS OF THE DELIVERABLE. A DELIVERABLE IS ANY VERIFIABLE OUTCOME DEFINED IN AN AGREEMENT THAT MUST BE PRODUCED BY A PROJECT OR A SUBPROJECT. INCLUDED ARE PRODUCTS OR SERVICES PROVIDED BY THE DELIVERY ORGANIZATION TO THE SPONSORING ORGANIZATION OR BY A SUPPLIER TO THE DELIVERY ORGANIZATION | THE PURPOSE OF A DELIVERABLE DEFINITION IS TO FORMALIZE WHAT THE RELEASING AND ACCEPTING PARTIES HAVE AGREED REGARDING: WHAT THE DELIVERABLE IS AND OF WHAT IT IS COMPOSED. WHEN THE DELIVERABLE WILL BE RELEASED. WHICH ACCEPTANCE CRITERIA HAVE TO BE MET BY THE DELIVERABLE. WHICH PROCESS WILL BE USED TO CHECK THOSE ACCEPTANCE CRITERIA. THE DELIVERABLE DEFINITION IS NOT INTENDED TO BE A DEVELOPMENT VIEW OF... | | 4 |
| 3.1.2 | DELIVERY CONTROL DOCUMENTATION | THE DELIVERY CONTROL DOCUMENTATION ACCOMPANIES A DELIVERABLE FROM THE TIME IT IS RELEASED UNTIL IT IS ACCEPTED. THE DELIVERY DOCUMENTATION HAS TWO SUB-TYPES DEPENDING ON HOW RELEASING AND ACCEPTING ROLES ARE DISTRIBUTED: THE PROJECT RELEASES THE DELIVERABLE AND IT IS ACCEPTED BY EITHER AN EXTERNAL SPONSOR OR ANOTHER COMPANY ENTITY. | THE PURPOSE OF THE DELIVERY CONTROL DOCUMENTATION IS: FOR THE RELEASING ROLE, TO CLEARLY IDENTIFY AUTHORIZATION TO RELEASE AND TO RECORD NOTIFICATION FROM THE ACCEPTING PARTY ABOUT THE DELIVERABLE BEING RELEASED, ACCORDING TO THE PLANS AND AGREEMENT. FOR THE ACCEPTING ROLE IMMEDIATELY AFTER THE RELEASE, TO RECORD THAT THE DELIVERABLE SEEMS COMPLETE SO THAT VALIDATION WORK CAN START. FOR THE ACCEPTING ROLE AFTER THE | REQUIRED | 5 | fig. 3B

3 WORK PRODUCT ASSESSMENT: WORKSHEET SUMMARY (CONTINUED)

| ID | WORK PRODUCT | DESCRIPTION | PURPOSE | DOCUMENTATION | ASSESSMENT |
|---|---|---|---|---|---|
| 3.1.3 | FINDINGS LOG | THE SUBCONTRACTOR RELEASES THE DELIVERABLE AND IT IS ACCEPTED BY THE PROJECT ORGANIZATION. THE FINDINGS LOG IS A RECORD OF THE IDENTIFICATION AND RESOLUTION OF FINDINGS. AS VALIDATION TAKES PLACE, THE FINDINGS LOG IS CREATED AND UPDATED AT THREE DISTINCT STAGES OF THE PROJECT: DELIVERABLES RECEIVED FROM A SUBCONTRACTOR ARE VALIDATED BY THE DELIVERY ORGANIZATION. DELIVERABLES THAT ARE TO BE RELEASED TO THE SPONSER ARE VERIFIED AND VALIDATED INTERNALLY BY THE DELIVERY ORGANIZATION, OFTEN BY A TESTING FUNCTION THAT IS INDEPENDENT OF THE DEVELOPMENT FUNCTION. DELIVERABLES RELEASED BY THE DELIVERY ORGANIZATION ARE VALIDATED BY THE SPONSOR OR... | VALIDATION WORK AS BEEN PERFORMED, TO RECORD NOTIFICATION TO ACCEPT OR REJECT THE FINDINGS LOG IS NEEDED TO FACILITATE THE MANAGEMENT OF THE DELIVERABLES DURING THE VALIDATION PROCESS UNTIL THEY ARE ACCEPTED BY THE RECEIVING ORGANIZATION. THE MANAGEMENT OF THE DELIVERABLES IS PERFORMED BY CONTROLLING THE RESOLUTION OF ANY FINDINGS THAT ARE IDENTIFIED. | | 0 |
| 3.1.4 | ISSUE DOCUMENT | AN ISSUE IS A MATTER OF CONCERN ON A PROJECT. THE ISSUE DOCUMENT DESCRIBES, IN DETAIL, THE ISSUE AND PROVIDES A COMPLETE HISTORY OF IT AS IT MOVES THROUGH ANALYSIS AND RESOLUTON. | THE PURPOSE OF AN ISSUE DOCUMENT IS TO RECORD THE DETAILS OF AN ISSUE IN ORDER TO SUPPORT ITS ANALYSIS AND THEN FOLLOW UP ITS RESOLUTION | REQUIRED | 2 |

*fig. 3B'*

| 3.1 | | WPs IN THE PROJECT SCOPE MANAGEMENT DOMAIN | ASSESSMENT (0-5) |
|---|---|---|---|
| 3.1.1 | | DELIVERABLE DEFINITION | 4 |
| 3.1.2 | R | DELIVERY CONTROL DOCUMENTATION | 5 |
| 3.1.3 | | FINDINGS LOG | 0 |
| 3.1.4 | R | ISSUE DOCUMENT | 2 |
| 3.1.5 | | PRODUCT BREAKDOWN STRUCTURE | 4 |
| 3.1.6 | R | PRODUCT DEFINITION | 4 |
| 3.1.7 | | WORK PRODUCT LIST | 4 |

| ASSESSMENT | 4 | 5 | □ | 2 | 4 | 4 | 4 |
|---|---|---|---|---|---|---|---|
| | DELIVERABLE DEFINITION | DELIVERY CONTROL DOCUMEN- TATION R | FINDINGS LOG | ISSUE DOCUMENT R | PRODUCT BREAKDOWN STRUCTURE | PROJECT DEFINITION R | WORK PRODUCT LIST x |
| | 3.1.1 | 3.1.2 | 3.1.3 | 3.1.4 | 3.1.5 | 3.1.6 | 3.1.7 |

*fig. 3C*

| | 1.1 PEOPLE RESOURCES | IMPACT TOTAL | STRENGTH OF EVIDENCE |
|---|---|---|---|
| 1.1.1 | DIFFICULT TO ACQUIRE SKILLED/TRINED RESOURCES FOR THE PROJECT | -5 | 4 |
| 1.1.2 | INEFFECTIVE OR UNCLEAR PROJECT ORGANIZATION AND ROLES | -2 | 3 |
| 1.1.3 | UNPLANNED TURNOVER OF KEY PROJECT TEAM MEMBERS | 0 | 0 |
| 1.1.4 | FAILURE OF KEY SUBCONTRACTOR TO DELIVER | -6 | 5 |
| 1.1.5 | POORLEY CONSTRUCTED OR UNAUTHORIZED SUBCONTRACTS | 0 | 0 |
| 1.1.6 | UNDERMINED MOTIVATION | 0 | 0 |
| 1.1.7 | WEAK/PROBLEM PERSONNEL | 0 | 0 |
| 1.1.8 | UNCONTROLLED PROBLEM EMPLOYEES | 0 | 0 |
| 1.1.9 | HEROICS | -3 | 3 |
| 1.1.10 | ADDING PEOPLE LATE | 0 | 0 |
| 1.1.11 | NOISY, CROWDED OFFICE | 0 | 0 |
| 1.1.12 | FRICTION BETWEEN DEVELOPERS AND CLIENT | -3 | 2 |
| 1.1.13 | UNREALISITIC EXPECTATIONS | -6 | 3 |
| 1.1.14 | LACK OF EFFECTIFE PROJECT SPONSORSHIP | 0 | 0 |
| 1.1.15 | LACK OF STAKEHOLDER BUY-IN | 0 | 3 |
| 1.1.16 | LACK OF USER INPUT | -2 | 3 |
| 1.1.17 | POLITICS PLACED OVER SUBSTANDE | 0 | 0 |
| 1.1.18 | WISHFUL THINKING | -6 | 4 |

*fig. 4A*

| CAT ID | ISSUE | INTERVIEW QUESTIONS | ADDITIONAL CONSIDERATIONS | EXAMINED PMBOK PROCESSES | EXAMINED WORK PRODUCTS | STRENGTH OF EVIDENCE | IMPACT: COST |
|---|---|---|---|---|---|---|---|
| 1.1 | | PEOPLE/RESOURCES | | | | | |
| 1.1.1 | | DIFFICULT TO ACQUIRE SKILLED/TRAINED RESOURCES FOR THE PROJECT | | | ORGANIZATION BREAKDOWN HUMAN RESOURCE PLAN | 4 | -2 |

*fig. 4B*

| CAT ID | ISSUE | INTERVIEW QUESTIONS | STRENGTH OF EVIDENCE | EXAMINED WORK PRODUCTS | WORKBOOK ID | WP ASSESSMENT (AVG) |
|---|---|---|---|---|---|---|
| 1.1 | | PEOPLE/RESOURCES | | | | |
| 1.1.1 | | INABILITY TO ACQUIRE SKILLED RESOURCES FOR THE PROJECT | 4 | ORGANIZATION BREAKDOWN HUMAN RESOURCE PLAN | 3.5.4 3.5.3 | 3.0 |
| 1.1.2 | | INEFFECTIVE OR UNCLEAR PROJECT ORGANIZATION AND ROLES | 3 | ORGANIZATION BREAKDOWN HUMAN RESOURCE PLAN | 3.5.4 3.5.3 | 3.0 |

*fig. 4C*

| ID | WWPMM CAT | WWPMM ACTIVITY | WORK PRODUCT DEPENDENCIES (WORKBOOK IDs) | DEPENDENT WP ASSESSMENT (AVG) | 3.1 SCOPE | | | | | | | 3.2 TIME | | | | 3.3 COST | 3.4 QUALITY | | | 3.5 HUMAN RESOURCES | | | | | | | | 3.6 COMMUNICATIONS | | | | | | |
|---|---|---|---|---|---|---|---|---|---|---|---|---|---|---|---|---|---|---|---|---|---|---|---|---|---|---|---|---|---|---|---|---|---|---|
| | | | | | 3.1.1 | 3.1.2 | 3.1.3 | 3.1.4 | 3.1.5 | 3.1.6 | 3.1.7 | 3.2.1 | 3.2.2 | 3.2.3 | 3.2.4 | 3.3.1 | 3.4.1 | 3.4.2 | 3.4.3 | 3.5.1 | 3.5.2 | 3.5.3 | 3.5.4 | 3.5.5 | 3.5.6 | 3.5.7 | 3.5.8 | 3.6.1 | 3.6.2 | 3.6.3 | 3.6.4 | 3.6.5 | 3.6.6 | 3.6.7 |
| | D DEFINING | | | | | | | | | | | | | | | | | | | | | | | | | | | | | | | | | |
| D1 | | UNDERSTAND OBJECTIVES AND PLAN DEFINING ACTIVITIES | 3.1.6 | 4.0 | | | | | | 4 | | | | | | | | | | | | | | | | | | | | | | | | |
| D2 | | DEFINE TARGET SOLUTION | 3.1.6 | 4.0 | | | | | | 4 | | | | | | | | | | | | | | | | | | | | | | | | |
| D3 | | DESCRIBE OVERALL APPROACH | 3.1.6 | 4.0 | | | | | | 4 | | | | | | | | | | | | | | | | | | | | | | | | |
| D4 | | SHAPE PROJECT | 3.5.4, 3.5.5, 3.1.7 | 2.0 | | | | | | | 4 | | | | | | | | | | | | 2 | | | | | | | | | | | fig. 5B

| ID | WWPMM CAT | WWPMM ACTIVITY | MAPPING TO PMBOK PROCESSES | LINKAGE TO ISSUES | WWPPM WORK PRODUCT ASSESSMENT (0-5) | WWPPM ACTIVITY ASSESSMENT (0-5) | RATIONAL FOR ASSESSMENT (BRIEF EXPLANATION) | EXISTENCE (0,1) | VALIDATION (2,3) |
|---|---|---|---|---|---|---|---|---|---|
| D | DEFINING | | | | | | | | |
| D1 | | UNDERSTAND OBJECTIVE AND PLAN DEFINING ACTIVITIES | 2.1.1 | 1.1.13, 1.1.14, 1.1.15, 1.2.10 | 4.0 | 3 | PROGRAM OBJECTIVES DEFINED, PLAN DEFINED | PROCESS DEFINED OR COMPLETED | PROJECT OBJECTIVES ENCAPSULATED BY PROJECT CHARTER IN PROJECT DEFINITION WP |
| D2 | | DEFINE TARGET SOLUTION | 2.1.1 | | 4.0 | 3 | TARGET SOLUTION DEFINED | | (VALUE ADD) |
| D3 | | DESCRIBE OVERALL APPROACH | | 1.2.3, 1.2.16 | 4.0 | 4 | OVERALL APPROACH DEFINED | PROCESS DEFINED | PROJECT SCOPE |
| D4 | | SHAPE PROJECT | 2.1.2, 2.5.1, 2.8.1, 2.8.2 | 1.1.1, 1.1.2 | 2.0 | 2 | PROJECT SHAPED AT HIGH LEVEL | PROCESS DEFINED OR COMPLETED | REVIEW ORGANIZATION BREAKDOWN STRUCTURE, PROJECT DECISION STRUCTURE, WORK PRODUCT LIST (PWO) WPs |
| D5 | | ASSES PROJECT PLAN | 2.1.1 | | 4.0 | 3 | SCOPE SET AT HIGH LEVEL | | | fig. 5C

| DOMAIN ID | PMBOK PROCESSES | MAPPING TO WWPMM ACTIVITIES | PMBOK PROCESS ASSESSMENT (0-5) | DEFINING | | | | |
|---|---|---|---|---|---|---|---|---|
| | | | | D1 | D2 | D3 | D4 | D5 |
| 2.1 PROJECT SCOPE MANAGEMENT | | | | | | | | |
| 2.1.1 | INITIATION | D1, D2, D5, S1 | 3.0 | 3 | 3 | | | 3 |
| 2.1.2 | SCOPE PLANNING | D4, P1, P4 | 2.0 | | | | 2 | |
| 2.1.3 | SCOPE DEFINITION | P1 | 2.0 | | | | | |
| 2.1.4 | SCOPE VERIFICATION | HD3, HD4 | 4.0 | | | | | |
| 2.1.5 | SCOPE CHANGE CONTROL | HE5 | 3.0 | | | | | | fig. 5D

METHOD, SYSTEM AND PROGRAM PRODUCT FOR ASSESSING A PRODUCT DEVELOPMENT PROJECT EMPLOYING A COMPUTER-IMPLEMENTED EVALUATION TOOL

TECHNICAL FIELD

The present invention relates in general to project evaluation tools, and more particularly, to methods, systems and program products employing a computer-implemented evaluation tool for assessing a product development project, such as an information technology application development project or hardware development project.

BACKGROUND OF THE INVENTION

Manual reviews of software application development projects are routinely performed to determine whether a project is on schedule, on budget and will deliver the promised function at the appropriate level of quality. Over the years, a number of researchers have shown that the failure rate of software development projects is exceptionally high and those studies also provide high level guidance on the typical or common root causes. The general categories of failure are known and are documented in many publications, including, for example, two publications authored by Steve McConnell entitled *Code Complete*, Microsoft Press (1993) and *Rapid Development*, Microsoft Press (1996), both of which are hereby incorporated herein by reference in their entirety. What is not as well understood is how to ascertain that a particular area of failure is present on a software development project. In addition, existing references do not include a logical approach to assess project management processes and their impact on the overall success or failure of a project.

A typical software project reviewer manually focuses on the project management system and/or dives deep into the technical aspects of the project. By operating purely at the project management system level, the reviewer may miss an underlying cause of corruption in the best practices by not applying a disciplined, logical approach to assessing the evidence that is generated by the effective use of project management best practices, i.e., by not assessing the artifacts that are produced. For example, a reviewer may look to determine that an issues management system is in place, but fail to check to determine if an issues log has the correct and adequate data to allow the issues management system to work. At the other end of the spectrum, i.e., at the technical end, a reviewer may focus on the technology or product dimensions of software delivery and fail to assess or understand the people and process impact on the ability of the team to deliver the required application.

By not having a logical, holistic, and end-to-end approach with consistent scoring and focused questions to identify areas of failure, the traditional review boils down to the application of the experience of the reviewer to the situation. If the reviewer has limited experience, then the validity of the project assessment suffers.

Thus, provided herein is a true end-to-end assessment approach which removes the product development project assessment from simply the reviewer's experience.

SUMMARY OF THE INVENTION

The shortcomings of the prior art are overcome and additional advantages are provided through the provision of a method of assessing a product development project. The method includes identifying multiple possible root causes of trouble for a product development project and identifying question sets for the multiple possible root causes of trouble. The method further includes providing a computer-implemented tool to evaluate answers to the question sets and provide guidance regarding possible existence of one or more root causes of trouble for the product development project from the identified multiple possible root causes of trouble.

Further aspects of the method include evaluating project management processes employed for the product development project by comparison thereof to identified, standard project management processes. The computer-implemented tool provides guidance regarding effectiveness of implementation of the project management processes employed for the product development project.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2A is a sample root cause of trouble and associated question set for identifying the root cause of trouble, in accordance with an aspect of the present invention;

FIGS. 3A, 3A' & 3A" are a sample work product assessment worksheet for evaluating an issue log, in accordance with an aspect of the present invention;

FIGS. 3B & 3B' are a sample worksheet summary produced by the work product assessment, in accordance with an aspect of the present invention;

FIG. 3C is a sample work product assessment chart derived from the work product assessment, which is partially summarized in the worksheet summary of FIGS. 3B & 3B', in accordance with an aspect of the present invention;

FIG. 4B is a partial sample strength of evidence scoring activity worksheet (A), which is a view of the root causes, in accordance with an aspect of the present invention;

FIG. 4C is a partial sample execution worksheet (B) scoring, which again is a view of the root causes and shows the examined work products and the assessment of the work products averaged together, in accordance with an aspect of the present invention;

FIG. 5B is a sample execution worksheet (B) which is an input to the activity worksheet (A) used in the work processes analysis process, wherein worksheet (B) maps the work products against the domains of IBM's World Wide Project Management Method (WWPMM), in accordance with an aspect of the present invention;

FIG. 5C is a sample activity worksheet (A) which is the input to the PMBOK process worksheet used in the work processes analysis process, and which shows the WWPMM domains and considers the work products that would be produced as part of the effective implementation of the process that the domain represents, in accordance with an aspect of the present invention;

FIG. 5D is a sample of the process worksheet which stores the data used in the process assessment chart, which is the output of the work processes analysis process, in accordance with an aspect of the present invention.

BEST MODE FOR CARRYING OUT THE INVENTION

Figure 1:
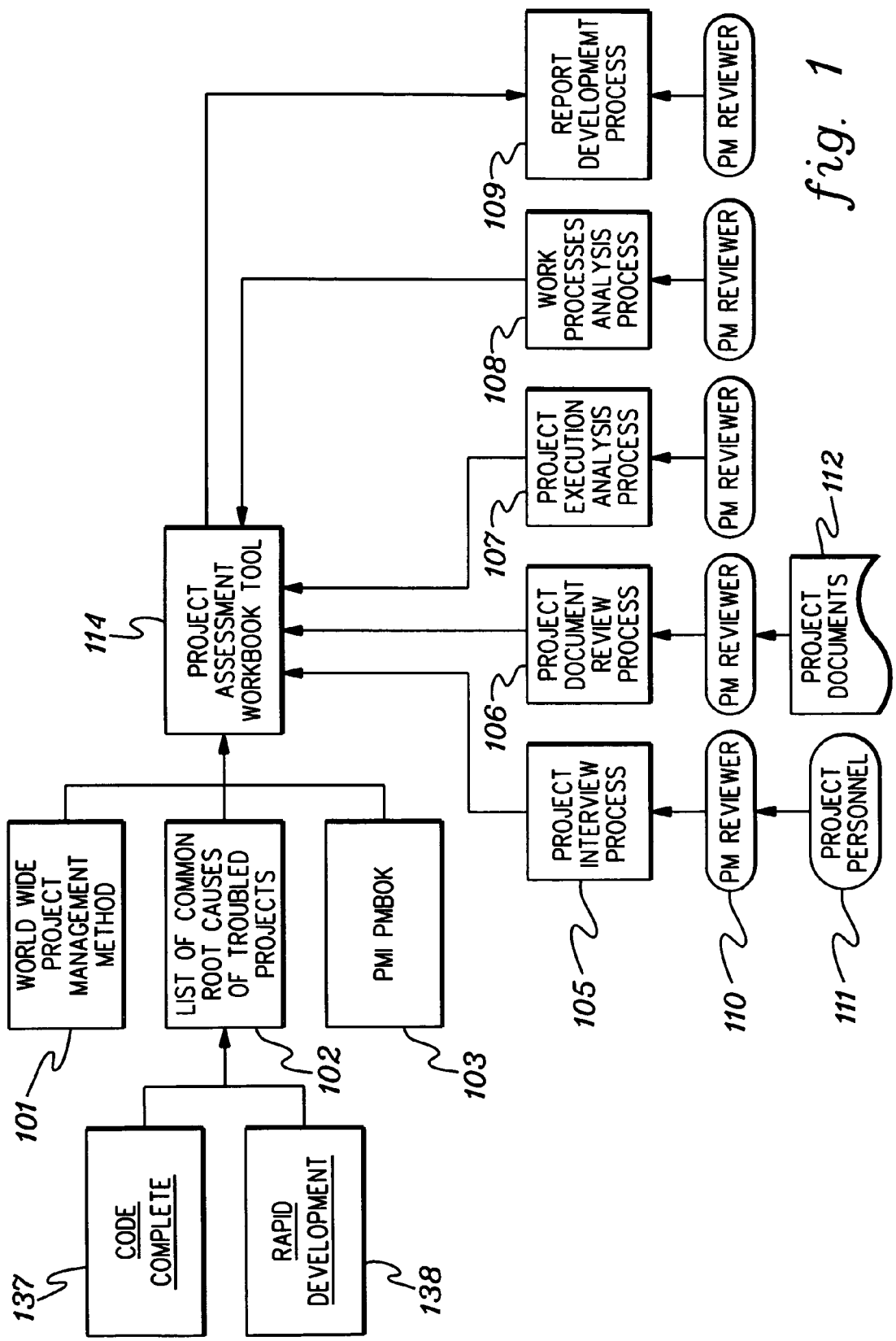
FIG. 1 is a block diagram of one embodiment of a process for assessing a product development project, in accordance with an aspect of the present invention.

The project assessment tool and process disclosed herein allow an evaluator to quickly identify and prioritize the existence of one or more common root causes for trouble on an information technology software or hardware development project, and relate these to the adequacy of the implementation of project management best practices. The tool and the process to apply the tool to an assessment, establish discipline in organizing the review team, identifying the project participants to interview, and generating a focused question set. Answers to the question sets are scored and allow the tool to identify the significance of the evidence regarding the existence of a particular root cause of trouble. The questions to ask to determine whether a particular root cause exists and to whom to ask those questions form a core that the scoring mechanism is built around.

In one aspect, the assessment process requires that the project management system also be evaluated. Using the standard project process structure advocated by the Project Management Institute as widely recognized best practices, the assessment tool and process provides the reviewer the means to score the application of best practices to the particular project. The tool and process recognize that individual project management artifacts should be considered to conclude whether a particular process has been effectively implemented. The tool/process includes an automated scoring mechanism that rolls up the quality assessment of the artifacts into the project management process area, supporting the reviewer's ability to judge the quality of implementation of each project management best practice area. The evaluation criteria to judge the fitness for purpose of a particular project management artifact and the linkage of that evaluation with the best practice area to allow assessment of the project management discipline forms a further aspect of the present invention.

The combination of the two views—the root cause view computed based on scored questions and the process view computed based on the artifact ratings and the process scoring—provide a project assessor prioritized insight into what is wrong with a project and which processes contribute most to a failure. This allows the reviewer to quickly develop recommendations for corrective action, if needed.

Scoring is thus determined based upon a computerized workbook tool scoring and the project manager reviewer scoring. The work product score is calculated by a computer implemented workbook tool. This computerized score rolls over into the process scoring. All work product scores that apply to a process are averaged and shown to the project manager reviewer as evidence. The workbook tool presents the reviewer with scoring guidelines for each process on an activity worksheet. The project manager reviewer considers that information, as well as the computed work product score, and manually scores the process. All scores are then used to assess the strength of evidence regarding the root causes. The project manager reviewer enters a score, based on the interview results and the work product and process scores, against each root cause (using the questions provided in the workbook tool (discussed further below)) in the area of strength of evidence, impact in terms of cost, time and requirements.

The Project Assessment Workbook Tool is a computer-implemented diagnostic tool for use by a Project Manager Reviewer (PM Reviewer) in three phases of a project assessment:

Information gathering/interviews
Analysis of documentation/data gathered
Preparation of assessment findings/report generation.

During the information gathering phase, the Project Manager Reviewer uses the focused diagnostic tool, i.e., the Project Assessment Workbook Tool, to ask specific, targeted questions to personnel in key project roles who interact with the members on the assessed project. The questions are organized to look for symptoms of the common root causes of failure for, for example, 61 typical potential trouble areas. Each root cause has a question set associated with it, and is identified with specific project roles to focus the questioning on the individuals who are likely to see the symptoms emerging. This allows the PM Reviewer to quickly diagnose potential problem areas. The PM Reviewer conducts interviews with project personnel during the interview phase of the engagement.

During analysis, for each potential problem area, the PM Reviewer works backwards. Problem areas are mapped to the common project management processes established by the Project Management Institute (PMI) (see "A Guide to the Project Management Body of Knowledge" (PMBOK® Guide), An American National Standard, ANSI/PMI 99-001-2000, PMI (2000 Edition), the entirety of which is hereby incorporated herein by reference):

Scope Management
Time Management
Cost Management
Quality Management
Human Resources Management
Communications Management
Risk Management
Procurement Management
Integration Management The PM Reviewer conducts further analysis, based on the possible failure to properly implement these best practice processes, of the trouble symptoms. Once the PM Reviewer identifies process failures, they trace these back to the supporting project management documentation and conduct additional analysis to determine what content is missing, is the document preparation cycle adequate, are the right project stakeholders involved, and answer other fundamental execution questions.

Root cause analysis of troubled projects (such as delineated in the above-incorporated publications by Steve McConnell in "Code Complete", Microsoft Press (1993) and "Rapid Development", Microsoft Press (1996)), together with the World Wide Project Management Method product available from International Business Machines Corporation, are embodied (in one embodiment) in the toolset, as explained further below. One of the first steps in the review is to quickly map the project process and documentation universe to the Work Products to exploit this attribute. Most project management methods are built on the PMI processes listed above and leverage a finite set of project management documents—it becomes a fairly quick exercise to discover what these documents are called by the project being reviewed. It also allows the PM Reviewer to identify any basic gaps between the project management method in use and the generally accepted project management methods.

This approach identifies and highlights project characteristics that represent key success/failure factors for the engagement. These are leveraged to become the basis of a report which graphically shows the areas of strength/weakness in a project's processes and work products.

Project Assessment Workbook Tool

FIG. 1 shows a Project Assessment Workbook Tool 104, which, in one example, can be an Excel-based spreadsheet with multiple inter-related worksheets running on a personal computer. The underlying constructs for the Project Assessment Workbook Tool 104 can be, for example, the fifty or so Work Products and definitions from the above-referenced IBM World Wide Project Management Method (WWPMM) product 101, a list of root causes of troubled projects 102 derived from the above-incorporated Steve McConnell texts 137, 138, and a list of management processes as defined by the Project Management Institute in the above-incorporated PMBOK 103 material. The WWPMM product available from International Business Machines Corporation (IBM) is summarized below for completeness. Also, the examples provided hereinbelow assume that the product development project to undergo assessment comprises a software development project.

The project management method employed by WWPMM is based on the Project Management Institute's internationally recognized framework.

The IBM World Wide Project Management Method (WWPMM) traces its heritage back to the basic principles of the PMBOK and adds focused extensions for applicability to Information Technology (IT) applications. In addition to recognizing the best practices established in the PMBOK, the developers of WWPMM employed other established methods and standards like IEEE, ISO 10006, and the Software Engineering Institute for guidance and direction. The resulting method, deployed for corporate wide application and use by IBM, represents the result of this research filtered through the successful delivery of thousands of IT projects.

WWPMM organizes the project management (PM) approach and method around domains and extends PMI by creating work patterns and work products. The architectural structure of the PMI framework and WWPMM are essentially the same with the PMI knowledge areas equating to WWPMM domains and PMI processes to WWPMM sub-domains and processes. In WWPMM, there are 13 domains versus the above-noted 9 knowledge areas of PMI and the 37 PMI processes map to 51 WWPMM sub-domains supported by 150 more focused processes. To meet the challenges of the IT application area, the extensions represented by the difference in numbers were added.

Work patterns are a series of steps designed to meet particular project management goals or in response to particular project management situations. In effect, work patters link the best practice processes into a series of useful steps that are event based (like a use case). These procedures provide step-by-step guidance to the PM to drive consistent execution to minimize risk. While they are designed to be usable on their own, the PM work patterns provide references to processes in the domains to enable easy access to more details.

Most of the PM work patterns can be activated at any time. For example, project management may have to release a subcontractor before starting another, or release design staff before beginning with developers.

Work products are the verifiable outcomes that are used to manage projects. The domains provide the high level grouping to organize the work patterns, and the work patterns produce work products.

There are four PMI knowledge areas that map directly to WWPMM domains:

| PMI Knowledge Area | WWPMM Domain |
| --- | --- |
| Project Quality Management | Quality Management |
| Project Human Resource Management | Human Resource Management |
| Project Risk Management | Risk Management |
| Project Procurement Management | Procurement Management |

Three of the domains employed in WWPMM fill gaps in the PMI knowledge areas:

Sponsor Agreement Management: The notion of an agreement, contract, or document of understanding between a sponsoring organization and a delivery organization is only touched on in the PMI framework. WWPMM focuses on this important area of project management to ensure that stakeholder commitment is strong and roles and responsibilities are well understood.

Event Management: This domain is a new area added by WWPMM to extend the discipline associated with issue and action management into a broader context. Event Management is the steps and procedures associated with handling the planned and unplanned events that occur in the project lifecycle.

Technical Environment Management: Given the highly technical nature of most IT projects, additional discussion, processes, and procedures around the management of the project technical environment are employed.

WWPMM restructured the integration and scope management PMI knowledge areas to better fit the applied concept of work products and work patterns and to better organize the planning and defining stages of the project.

| | Maps into WWPMM Domain(s) |
| --- | --- |
| Project Integration Management | |
| Plan development | Work patterns |
| Plan execution | Work patterns |
| Overall change control | Change management |

-continued

| | Maps into WWPMM Domain(s) |
|---|---|
| Project Scope Management | |
| Initiation | Project definition |
| Scope planning | Project definition |
| | Deliverables management |
| Scope definition | Work plan management |
| Scope verification | Deliverables management |
| Scope change control | Change management |
| | Deliverables management |

PMI's Project Time Management, Cost Management, and Communication Management were restructured to separate work management and reporting as shown below.

| | Maps into WWPMM Domain(s) |
|---|---|
| Project Time Management | |
| Activity definition | Work plan management |
| Activity sequencing | Work plan management |
| Activity duration estimation | Work plan management |
| Schedule development | Work plan management |
| Schedule control | Work plan management |
| | Tracking and control |
| | Change management |
| | Event management |
| Project Cost Management | |
| Resource planning | Human resource management |
| Cost estimating | Work plan management |
| | Tracking and control |
| Cost budgeting | Work plan management |
| Cost control | Tracking and control |
| | Change management |
| Project Communication Management | |
| Communication planning | Communications management |
| Information distribution | Communications management |
| Performance reporting | Communications management |
| Administrative closure | Quality management |

Core to WWPMM is the notion of a project management system. The project management system is the way in which a particular project is managed. It is documented as a collection of plans and procedures that direct all project management activity, and records that provide evidence of their implementation. WWPMM includes a set of plans, procedures, and record templates that may be quickly and easily tailored to meet the needs of each individual project or client. Note that the management system of a project may include multiple management systems (such as the quality management system from ISO 9000:2000). Specifically for WWPMM, the PM System includes:
  The plans describing the work to be performed and how the project will operate
  The procedures that allow tasks to be performed in a systematic and visible manner
  The records that the PM uses to control status and events
  The project management activities that are used to plan, control and react to day to day situations
  The project management resources and tools available to support the delivery of the project.
Continuing with FIG. 1, the above-discussed WWPMM materials 101, the list of common root causes of trouble for software development projects 102, and the PMI PMBOK materials 103 can be employed (in one example) by one of ordinary skill in the art to create the Project Assessment Workbook Tool 104 described herein. Tool 104 provides a disciplined approach to assessing a product development project. The actual question sets for root causes of trouble and product management processes evaluation, as well as work product evaluation may vary depending upon the particular product development project under assessment. The above-described materials provide a basis for one of ordinary skill in the art to implement a product assessment tool as described herein.

When in operation, the product assessment tool 104 receives input from a project interview process 105, a project document review process 106, a project execution analysis process 107, and a work processes analysis process 108. A Project Management (PM) Reviewer 110 interfaces with project personnel 111 during the project interview process, and extracts information from project documents 112 during the project document review process 106. The PM reviewer also provides input during the project execution analysis process and the work processes analysis process. Output from the computer-implemented project assessment tool 104 are one or more reports provided during a report development process 109. If desired, the project assessment tool can be customizable by the PM reviewer to ascertain one or more specific reports to quickly evaluate one or more aspects of the product development project.

Project Interview Process

Figure 2:
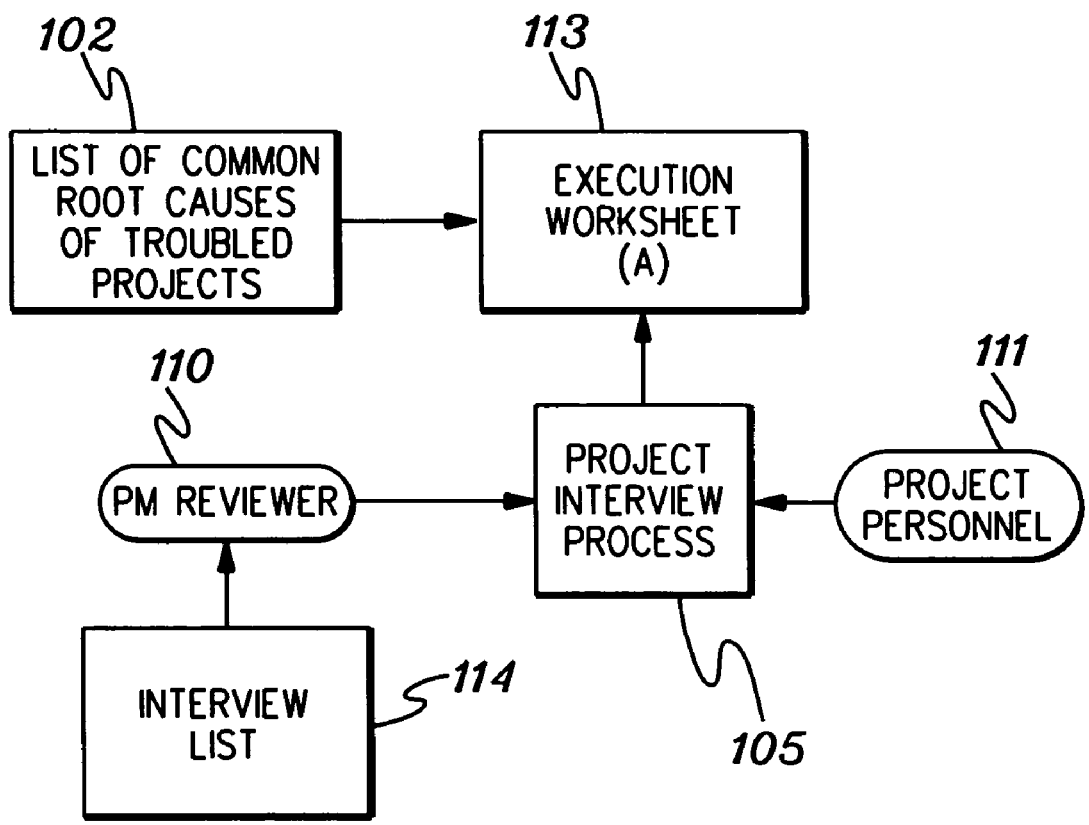
FIG. 2 is a block diagram of one embodiment of the project interview process of FIG. 1, in accordance with an aspect of the present invention.

As shown in FIG. 2, the PM reviewer 110 and the project personnel 111 are the actors in the project interviewer process 105. The PM Reviewer 110 uses the Interview List 114 documented in the tool, which itemizes the personnel roles which should be interviewed in the project assessment. For an IT application development project, the interview list can comprise a plurality of roles commonly associated with the software project, such as Lead Data Architect, Lead Business Analyst, Executive Sponsor, etc.

An Execution Worksheet (A) 113 is a worksheet with specific question sets 129 (see FIG. 2A) for an area of review. The execution worksheet (A) 113 contains question sets which provide guidance on existence of particular root causes of trouble for the product development project. The questions can be grouped under four headings:
  People/Resources
  Process/Management Discipline
  Product/Customer Expectations
  Information Technology Management An example of the type of questions is shown in sample questions set 129 in FIG. 2A. These show a few of the questions that relate to People/Resources, and in this example, relate to a specific root cause of trouble, i.e., "Difficult to Acquire Skilled/Trained Resources for the Project".

The focused questions in the Execution Worksheet (A) 113 preclude the need to interview multiples of people in the same role. Each of the questions is to be answered by specific roles in the Interview List 114. These roles are in columnar format on the worksheet. There is an indicator which shows the PM Reviewer that a question is to be asked of a specific role. This indicator is replaced during the interview session by codes indicating the quality of the response, i.e. "generic", "could not provide an answer", or "provided a good specific answer". The answer is placed in the appropriate cell in the Execution Worksheet (A) 113. The responses can be answered usually by a limited amount of detail. At the close of the interview sessions the PM Reviewer scores the responses for impact to the project overall, impact to schedule and impact to project cost on a scale, for example, of 0 to −6 indicating the impact. The Execution Worksheet is completed in the Project Execution Analysis Process 108.

Project Document Review Process

Figure 3:
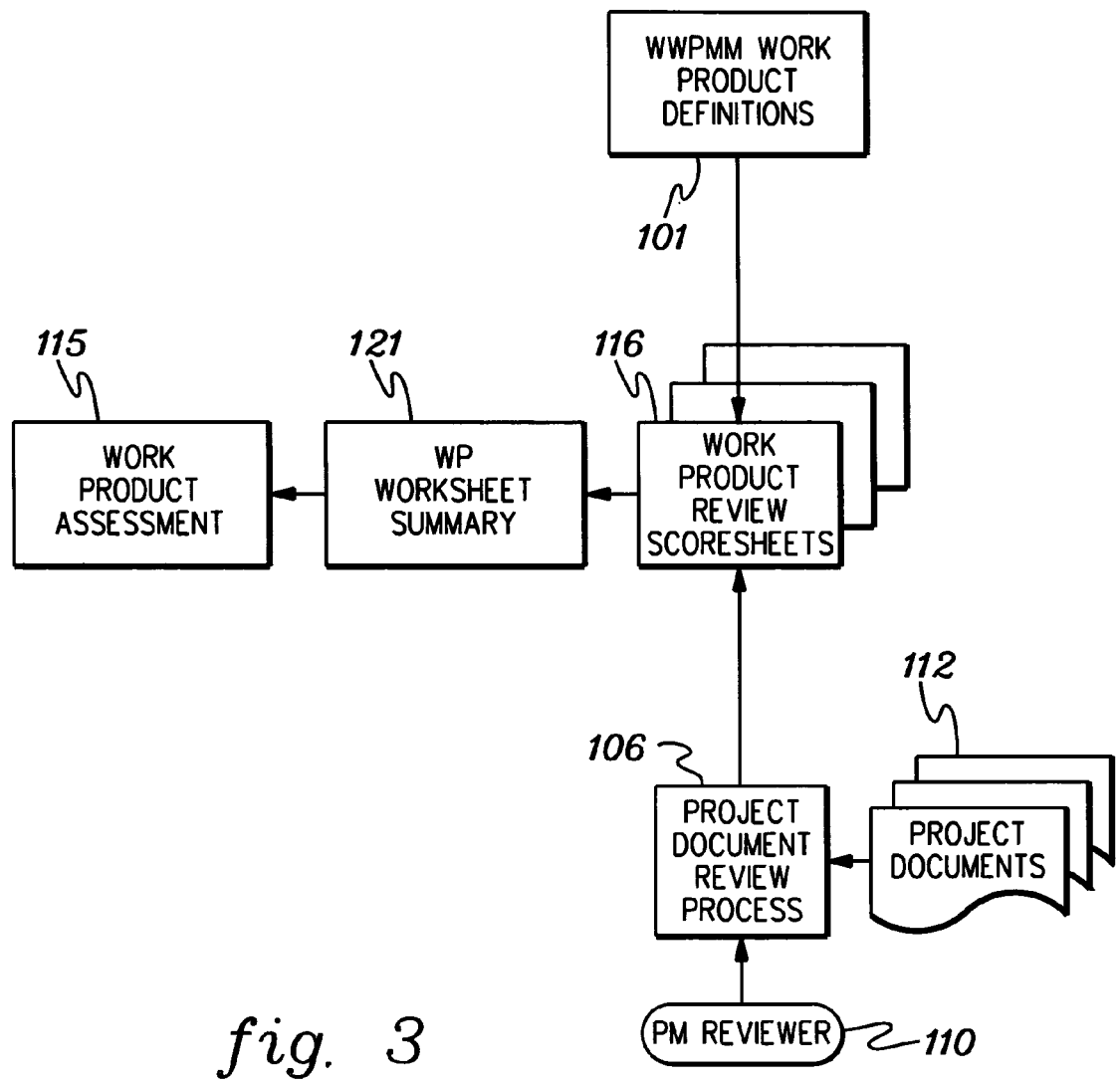
FIG. 3 is a block diagram of one embodiment of the project document review process of FIG. 1, in accordance with an aspect of the present invention.

The questions asked in the Project Interview Process are validated or negated by the absence/presence of related data appearing in the artifacts of the project, known as Work Products. As shown in FIG. 3, the PM Reviewer 110 reviews the project management documents 112 that can be used on a project, as documented in WWPMM 101, and checks that the required data is present, current and appropriate. Basic documents would include work products such as Delivery Control Documentation, Project Definition Report, Financial Plan, etc.

Each document is scored against the appropriate Work Product Review Score sheet 116 which also indicates which fields are required. As shown in FIGS. 3A, 3A' & 3A", there is a column with a short description of the data that is required to assist the PM Reviewer 110 in making a judgment when assessing the field. The field is marked Y if the data is shown in the document being reviewed. There is space for the field name used in the document for tracking purposes and a space for any comments. The worksheet counts the number of Y responses and scores it against the total number of required fields. The scores go from 0 to 10 depending on the percentage of required fields present in the document (see FIG. 3A").

The PM Reviewer then scores the document for Data Currency, Data Frequency, Data Quality and Existence. A scoring algorithm is created to generate a final score from 0 to 5, with 0 indicating that the document containing the required data does not appear to exist on this project to 5 indicating documents appear to contain appropriate required data. The scoring algorithm for the worksheet can be readily created by an experienced project management reviewer for a given product development project.

The Work Product Review Scoresheet 116 contains, where appropriate, information on why the document is required on a project, and the impact of not having the document to the project. Also, the Work Product Review Scoresheet 116 contains, where appropriate, validation and verification criteria; cross-checks with other Work Product documents; the Process Management Group to which the document relates; and any other useful notes. As noted, an example of a completed Work Product Review Scoresheet for Issue Documentation is shown in FIGS. 3A, 3A' & 3A".

The WP Worksheet Summary 121, a sample of which is shown in FIGS. 3B & 3B', provides information on each of the Work Products reviewed.

The Worksheet Summary 121 sets out for each Work Product
- The ID relating back to the Worksheet tab
- The Work Product WWPMM name
- The PMI Project Management Domain
- A description of the Work Product
- The purpose of the Work Product
- If the document is required on the project
- The assessment score which is populated automatically from the Work Product Review Scoresheet 116.

The Work Product Assessment 115 captures and organizes the data originally collected in the 50+ Work Product Worksheets 116, displaying the results in both tables and graphs, and organizing the Work Products by PMI domain.

The scores from WP Worksheet Summary 121, populate a set of pre-formatted charts in the Work Product Assessment worksheet 115. The charts show the documents that are appropriate to a specific PMI domain—such as Project Scope Management Domain, and show graphically the scoring of each document in that domain and also if it is a required document.

A sample of a Project Scope Management Domain Work Product is shown in FIG. 3C.

Project Execution Analysis Process

Figure 4:
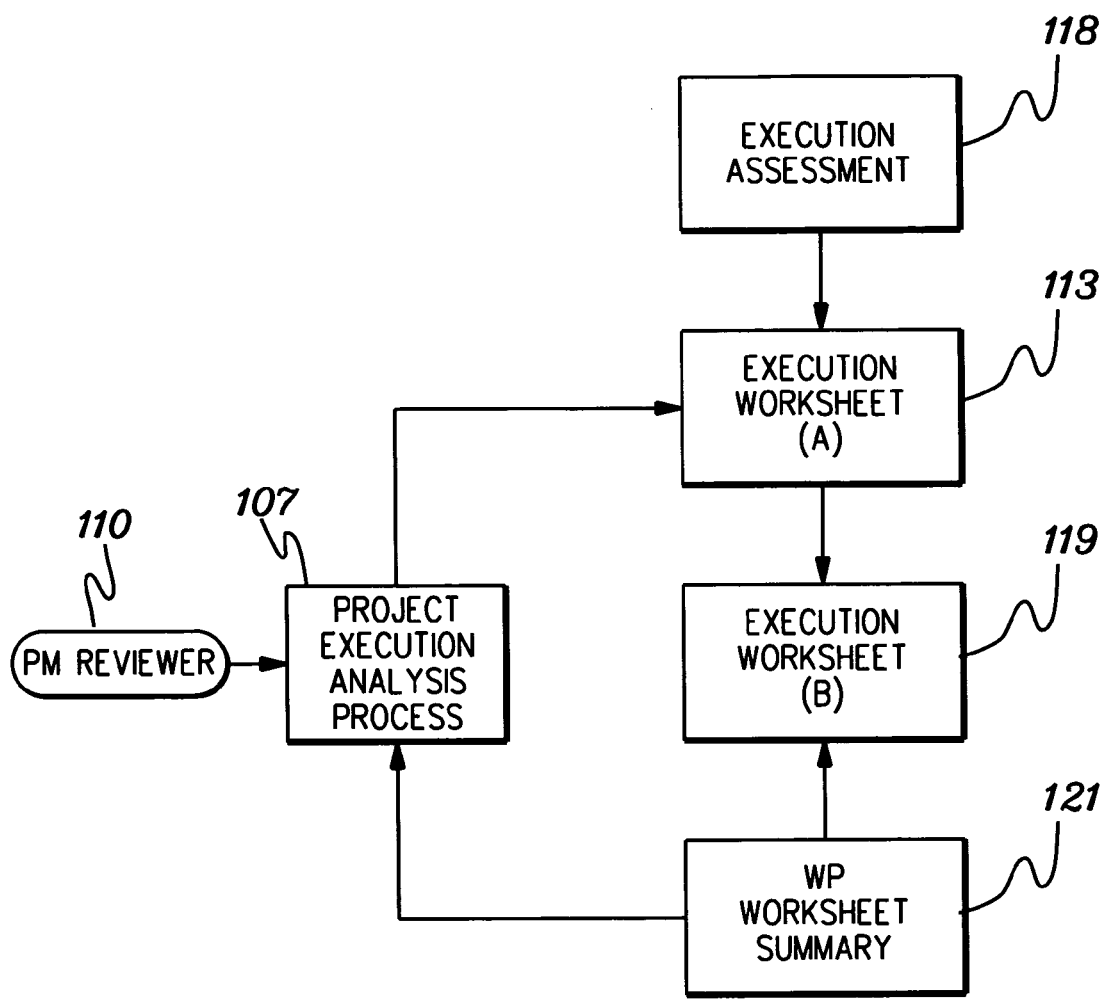
FIG. 4 is a block diagram of one embodiment of the project execution analysis process of FIG. 1, in accordance with an aspect of the present invention.
Figure 4A:
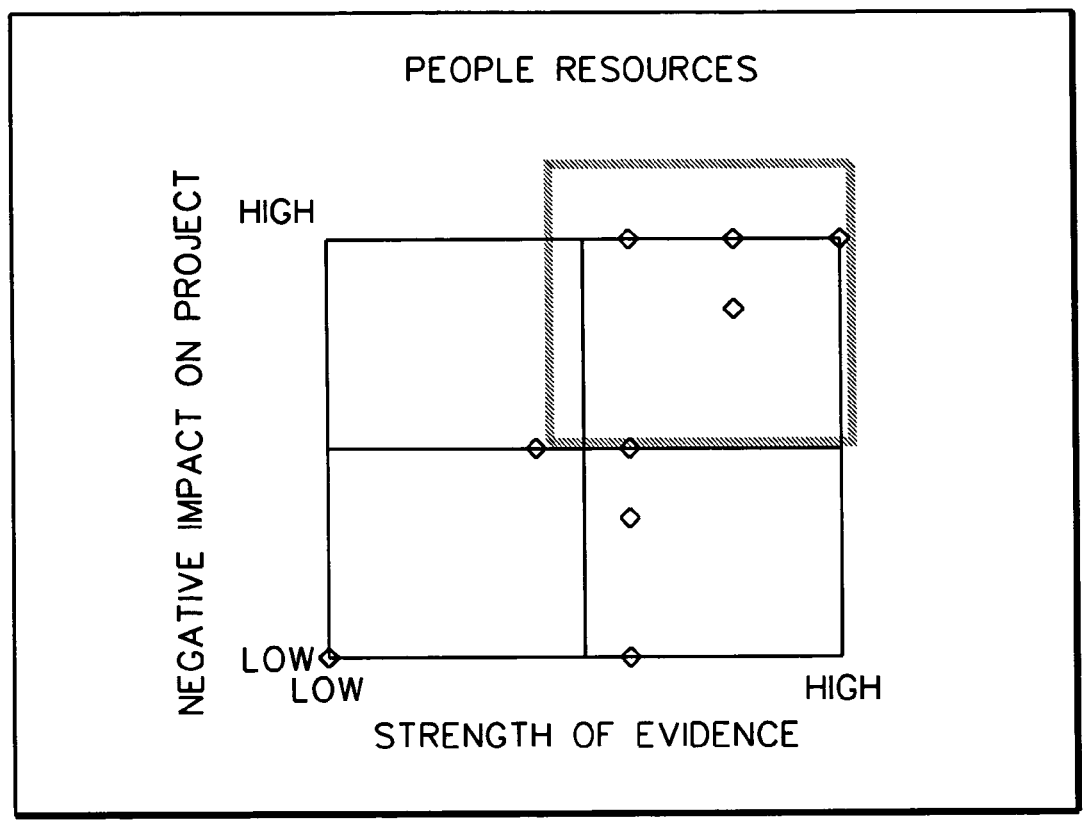
FIGS. 4A and 4A' are a sample execution assessment table and findings chart, respectively, in accordance with an aspect of the present invention.

Referring to FIGS. 4, 4A, 4A', 4B & 4C, the Execution Worksheet (A) 113 includes areas to document the interview progress and high-level responses (see FIG. 4B).

In the Project Execution Analysis Process 107, the PM Reviewer 110 evaluates and validates the responses in Execution Worksheet (A) 113 against the evidence of the documentation that was developed in the Project Document Review Process 106 (see FIG. 3). As shown in FIG. 4B, the Execution Worksheet (A) has a column headed "Examined Work Products" setting out the Work Products that validate or mitigate the interview responses. A sample of the Strength of Evidence Scoring is also shown in FIG. 4B.

The Execution Worksheet (B) 119 provides a linkage between the Issues and the dependent Work Products.

The evidence scoring from Execution Worksheet (A) 113 also populates the Execution Worksheet (B) 119 (see FIG. 4C). This worksheet maps the evidence score to the appropriate Interview Question Topic and also shows an average of the scores from the WP Worksheet Summary 115 documents relevant to the question. These results should be reviewed for any anomalies between evidence and WP Worksheet Summary 115 results. Any anomalies should be investigated and resolved before going further with the processes relating to the Project Assessment Workbook.

The Execution Assessment 118 (see FIGS. 4, 4A, & 4A') findings capture and organize the data collected in the Execution Worksheet (A), displaying the results in both tables and graphs. Findings highlighted indicate issues where strong evidence exists that they are causing a significant impact on the project.

The scoring for evidence and impact in the Execution Worksheet (A) 113 populate the charts in the Execution Assessment (see FIG. 4A'). The Execution Assessment chart shows graphically on a two by two matrix the clustering of issues with the issues having he highest impact and validated by evidence in the top right matrix. The relevant issues are highlighted in the accompanying question set.

A sample of the People/Resources Issue set and graph is shown in Execution Assessment Findings of FIGS. 4A & 4A'.

Work Processes Analysis Process

Figure 5:
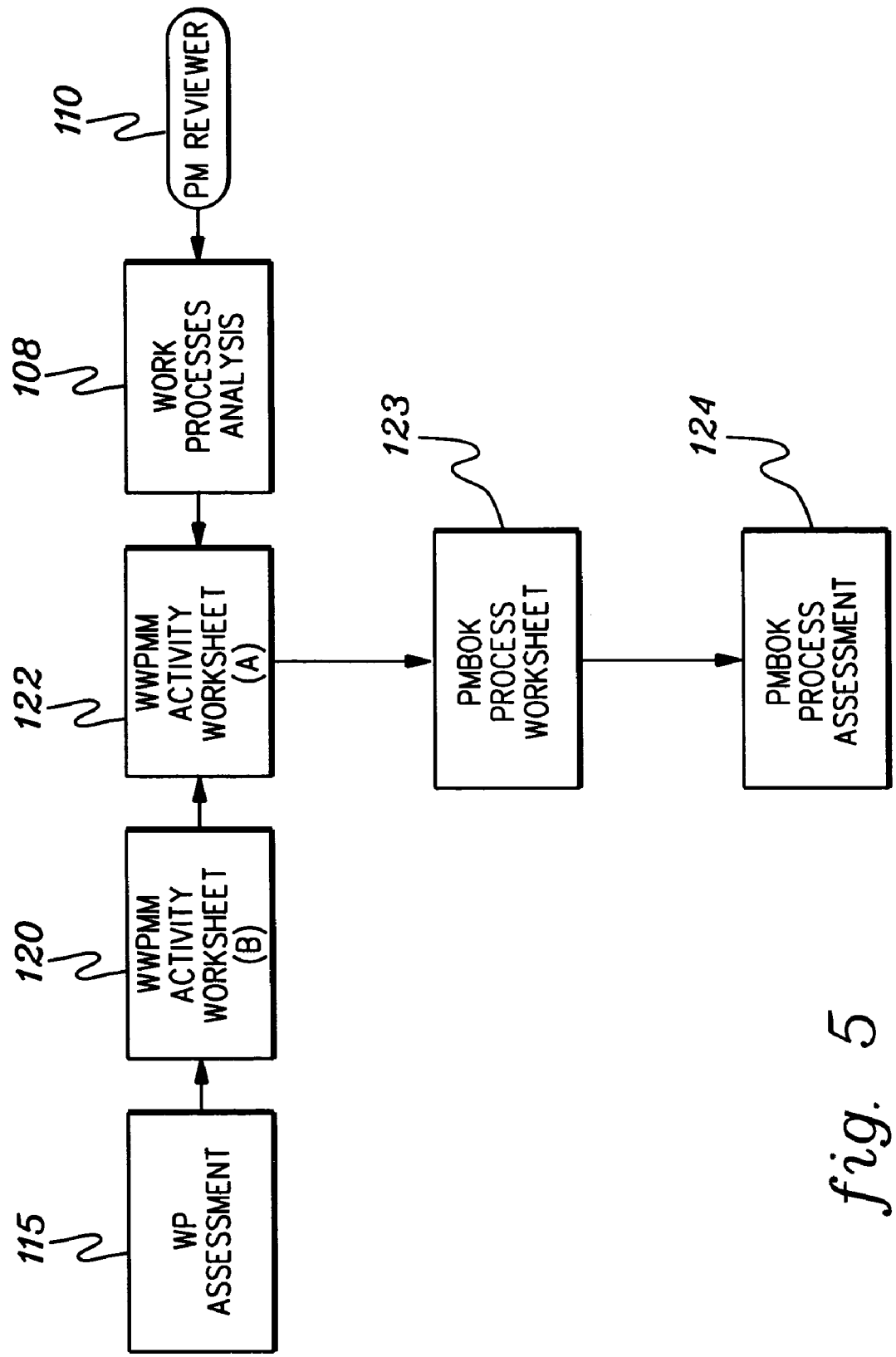
FIG. 5 is a block diagram of one embodiment of the work processes analysis process of FIG. 1, showing inputs for developing the project assessment report, in accordance with an aspect of the present invention.

Referring to FIGS. 5-5D, WWPMM Activity Worksheet (B) 120 provides the linkage between the WWPMM Activities and their dependent Work Products.

The scoring from the Work Product Assessment 115 populates the WWPMM Activity Worksheet (B) 120. The Worksheet maps the Work Product Assessment 115 for each Work Product under the appropriate PMI Management Domain. The PMI Management Domains are mapped to the appropriate WWPMM Activities within the WWPMM Project Phases. A sample of a WWPMM Activity Worksheet (B) is shown in FIG. 5B.

The WWPMM Activity Worksheet (A) 122 provides an assessment for each WWPMM activity based on a scale ranging from 0 to 5. The sheet also captures the dependencies between WWPMM activities and the PMBOK Processes and Execution Issues. A sample of Activity Worksheet (A) 122 is shown in FIG. 5C.

Information for the Work Products from the WWPMM Activity Worksheet (B) 120 populates the WWPMM Work Product Assessment column of the WWPMM Activity Worksheet (A) 122. During a work processes analysis, the PM Reviewer 110 scores the WWPMM activities set out in each row in the WWPMM Activity Assessment column. The PM Reviewer 110 notes the reason in the Rational for Assessment column.

The PMBOK Process Worksheet 123 maps the PMI Processes to the WWPMM activities and then provides an assessment for each process calculated by taking the average of the ratings given to its corresponding WWPMM activities. A sample of the PMBOK Process Worksheet 123 is shown in FIG. 5D.

Figure 5A:
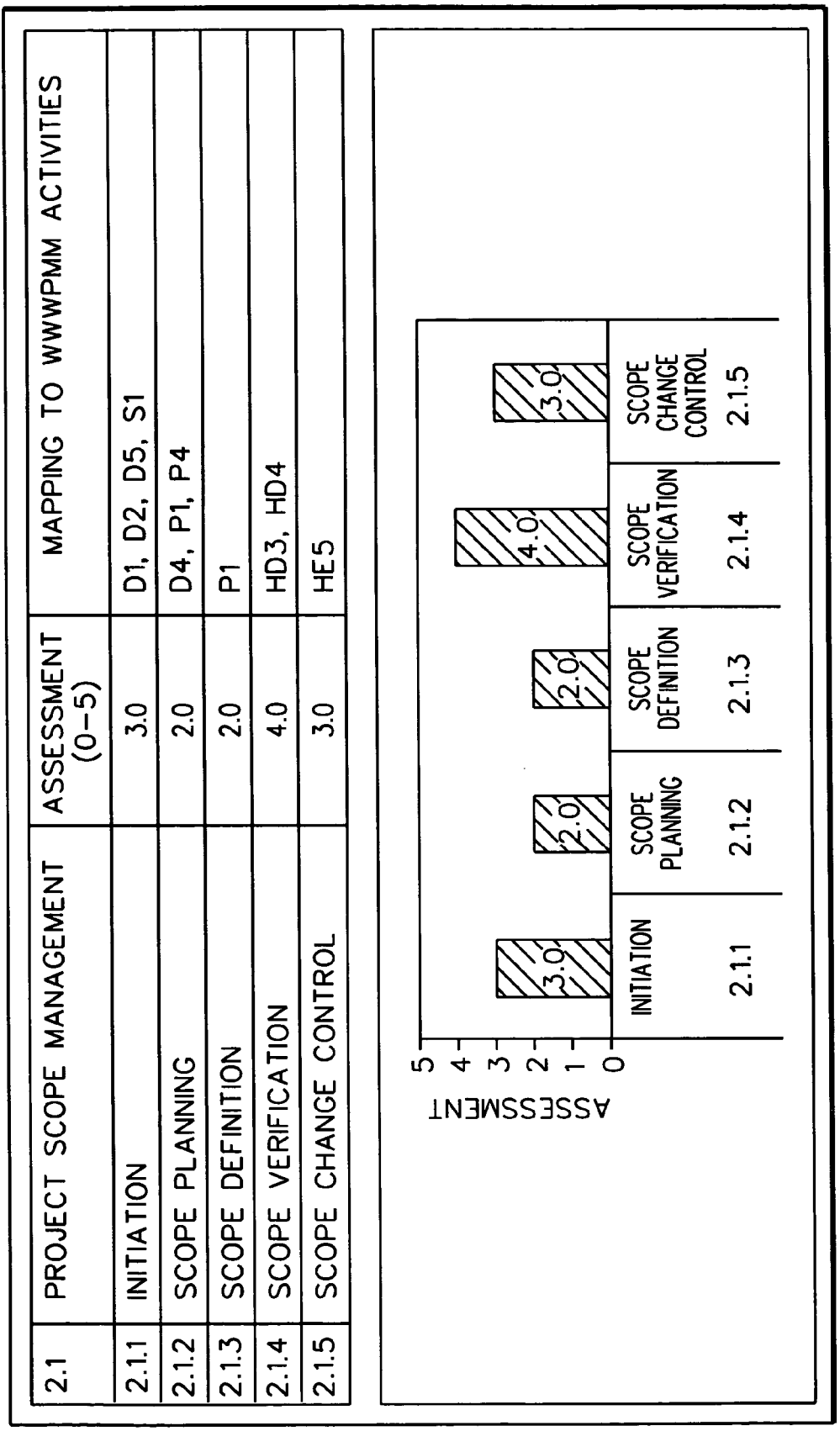
FIG. 5A is a sample process assessment chart showing one of the tables and graphs that can be generated for the various project management domains in the work processes analysis process, in accordance with an aspect of the present invention.

The PMBOK Process Assessment 124 Findings worksheet captures and organizes the data collected in the PMBOK Process Worksheet 123 displaying the results in both tables and graphs. There is a chart and graph for each of the PMI domains noted in the Invention Summary. A Sample of the PMBOK Process Assessment is shown in FIG. 5A.

Report Development Process

Figure 6:
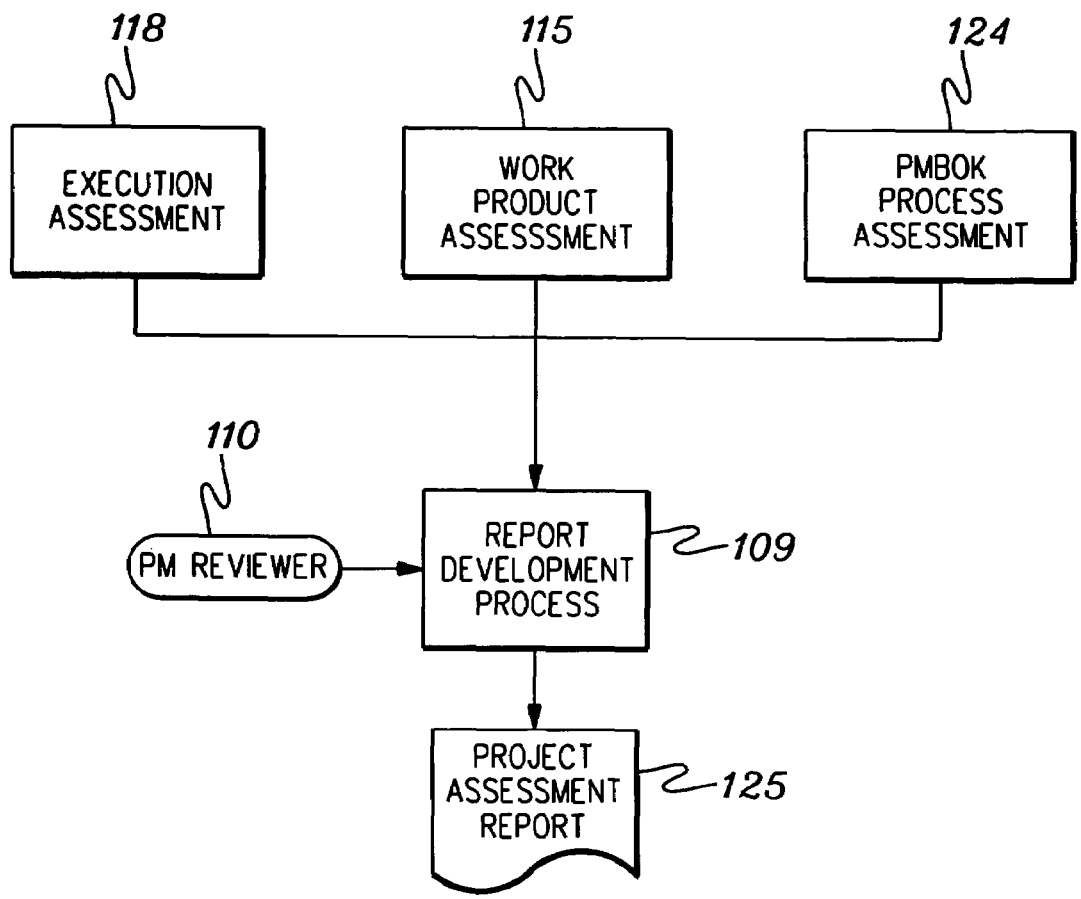
FIG. 6 is an expansion of the report development process of FIG. 1, showing the inputs from FIGS. 2, 4 & 5, in accordance with an aspect of the present invention.

Referring to FIG. 6, the charts and graphs that are generated in the Execution Assessment 118, the PMBOK Process Assessment 124 and the Work Product Assessment 115 can be easily cut and pasted by the PM reviewer 110 (during a Report Development Process 109) into a Word document to provide the Findings portion of a report 125. Evaluation of the graphs provides the basis for recommendations for remediation of any disclosed project management deficiencies, and capitalizing on the strengths that have been validated in the Project Assessment Process.

To summarize, those skilled in the art will note from the above description that provided herein is a project assessment approach which employs a Product Assessment Workbook Tool, which in one embodiment, comprises a spreadsheet that builds on the concepts of good project management set out in the World Wide Project Management Methodology offered by International Business Machines Corporation, as well as the processes promulgated by the nationally recognized Product Management Institute (PMI).

The Project Assessment Workbook Tool may be an Excel-based workbook that examines the effectiveness of project management on a project by:

1. Validating the existence of project management work products and their quality;
2. Validating project management compliance based on the project Management Institute's Project Management Book of Knowledge; and
3. Using an interview approach to look for indications of trouble based on 61 identified root causes of possible project failure.

Each of the above three areas has a specific section in the assessment workbook. The assessment workbook includes worksheets that are completed by the reviewer for each of the three sections, and numerical scores are given to the answers received. The Project Management Reviewer inputs the answers through examination of documentation and interviews with project personnel. The project documentation required, the roles of the interviewees, and the questions to be asked are all set out specifically in the assessment workbook. The answers are assigned numerical scores, and these numerical indicators for the three areas are rolled up and come together in a graphical format, e.g., four separate quadrant graphs (people/resources, product/customer expectation, technology and process/management disciplines).

The assessment workbook applies discipline and rigor to a process that is heretofore depended solely on the judgment and the project management experience of the interviewer. Although the assessment workbook should be used as a diagnostic tool by personnel versed in project management, it allows diverse projects to be assessed with the same criteria by different qualified personnel. Use of the assessment workbook allows a review team to effectively assess projects quickly and with precision based on a finite number of interviews (for example fifteen or less) and a specific documentation list (e.g., approximately fifty), irrespective of the size or dollar value of the project.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of assessing a product development management effort comprising:
   identifying multiple possible root causes of trouble for a product development management effort, the product development management effort being undertaken to produce a tangible product;
   identifying (1) multiple questions sets for diagnosing the multiple possible root causes of trouble, each question set being a comprehensive set of questions directed to diagnosing a respective root cause of trouble of the multiple possible root causes of trouble; and (2) one or more specific project roles to provide responses to questions of one of the multiple question sets, the responses from the one or more specific project roles;
   diagnosing, based at least in part on the responses, the respective root cause of trouble and thus assessing the product development management effort to produce the tangible product, wherein different specific project roles are identified to provide responses to questions of different questions sets of the multiple question sets;
   wherein the diagnosing comprises:
      evaluating, using a computer-implemented tool, responses to the question sets, wherein the evaluating comprises:
         automatically counting, using an automated scoring mechanism, the number of responses in required fields of a question set of the multiple question sets; and
         scoring, using the automated scoring mechanism, the question set against a total number of required fields in the question set, wherein the scoring depends on a percentage of required fields present in the question set;

thereby producing a numeric value which is an indication of the strength of responses for the question set, the strength of responses indication being an indication of the strength of evidence of the respective root cause of trouble; and producing a numeric value representing the impact of the respective root cause of trouble on the project development management effort based on at least one of impact to schedule or impact to project cost;

wherein evaluating provides guidance regarding an existence of one or more root causes of trouble for the product development effort from the identified multiple possible root causes of trouble;

plotting, using the computer-implemented tool, each root cause of trouble of the multiple possible root causes of trouble using the produced numeric values in a graph with a first axis representing strength of evidence for the respective root causes of trouble and a second axis representing negative impact of the respective root causes on the product development management effort, wherein the graph is a matrix representing a mix of high and/or low negative impact and strength of evidence; and assessing, based at least in part on the graph, the product development management effort by identifying a possible root cause of trouble of the multiple possible root causes of trouble in a particular region of the matrix representing a high negative impact on the product development management effort and a high strength of evidence in support of the presence of the root cause of trouble;

wherein diagnosing provides guidance regarding effectiveness of implementation of project management processes employed for the product development management effort.

2. The method of claim 1, further comprising evaluating project management processes employed for the product development management effort by comparison thereof to identified, standard project management processes, and wherein the computer-implemented tool provides guidance regarding effectiveness of implementation of the project management processes employed for the product development management effort.

3. The method of claim 2, further comprising evaluating project management work product of the product development management effort and inputting work product assessment to the computer-implemented tool as further evidence of the existence of the one or more root causes of trouble for the product development management effort or the effectiveness of implementation of the project management processes employed for the product development project.

4. The method of claim 1, further comprising identifying in the computer-implemented tool the specific project personnel roles to answer questions of the multiple question sets, wherein the multiple question sets also reside in the computer-implemented tool.

5. The method of claim 1, wherein the product development management effort comprises one of a management effort for a software development project or a management effort for a hardware development project.

6. A system for assessing management of a product development project comprising:

a processor comprising a computer-implemented tool, the computer-implemented tool:

identifying multiple common root causes of trouble for a product development management effort undertaken to produce a tangible product, and further identifying (1) multiple question sets for diagnosing the multiple common root causes of trouble, each question set being a comprehensive set of questions directed to diagnosing a respective root cause of trouble of the multiple possible root causes of trouble; and (2) one or more specific project roles to provide responses to questions of one of the multiple question sets, the responses from the one or more specific product roles;

the computer-implemented too further diagnosing, based at least in part on the responses, the respective root cause of trouble and thus assessing the product development management effort to produce the tangible product, wherein different specific project roles are identified to provide responses to questions of different questions sets of the multiple question sets, the diagnosing comprising:

evaluating responses to the question sets, the evaluating comprising:

automatically counting using an automated scoring mechanism, the number of responses in required fields of a question set of the multiple question sets;

scoring, using the automated scoring mechanism, the question set against a total number of required fields in the question set, wherein the scoring depends on a percentage of required fields present in the question set, thereby producing a numeric value which is an indication of the strength of responses for the question set, the strength of responses indication being an indication of the strength of evidence of the respective root cause of trouble, and producing a numeric value representing the impact of the respective root cause of trouble on the project development management effort based on at least one of impact to schedule or impact to project cost, wherein the evaluating provides guidance regarding an existence of one or more root causes of trouble for the product development effort from the identified multiple possible root causes of trouble, the diagnosing further comprising plotting each root cause of trouble of the multiple possible root causes of trouble using the produced numeric values in a graph with a first axis representing strength of evidence for the respective root causes of trouble and a second axis representing negative impact of the respective root causes on the product development management effort, wherein the graph is a matrix representing a mix of high and/or low negative impact and strength of evidence, and the diagnosing further comprising assessing, based at least in part on the graph, the product development management effort by identifying a possible root cause of trouble of the multiple possible root causes of trouble in a particular region of the matrix representing a high negative impact on the product development management effort and a high strength of evidence in support of the presence of the root cause of trouble, wherein diagnosing provides guidance regarding effectiveness of implementation of project management processes employed for the product development management effort.

7. The system of claim 6, wherein the computer-implemented tool evaluates project management processes employed for the product development management effort by comparison thereof to identified, standard project management processes, and provides guidance regarding effectiveness of implementation of the project management processes employed for the product development management effort.

8. The system of claim 7, wherein the computer-implemented tool further evaluates project management work product of the product development management effort as further evidence of the existence of one or more root causes of trouble for the product development management effort or the effectiveness of implementation of the project management processes employed for the product development management effort.

9. The system of claim 6, wherein the computer-implemented tool identifies the specific project personnel roles to answer questions of the multiple question sets, wherein the multiple question sets also reside within the computer-implemented tool.

10. The system of claim 6, wherein the product development management effort comprises one of a management effort for a software development project or a management effort for a hardware development project.

11. At least one program storage device readable by a computer embodying at least one program of instructions executable by the computer to perform, when executing on the computer, a method of assessing a product development management effort, the method comprising:

identifying multiple possible root causes of trouble for a product development management effort, the product development management effort being undertaken to produce a tangible product;

identifying (1) multiple question sets for diagnosing the multiple possible root causes of trouble, each question set being a set of comprehensive questions directed to diagnosing a respective root cause of trouble of the multiple possible root causes of trouble; and (2) one or more specific project roles to provide responses to questions of one of the multiple question sets, the responses from the one or more specific project roles;

diagnosing, based at least in part on the responses, the respective root cause of trouble and thus assessing the product development management effort to produce the tangible product, wherein different specific project roles are identified to provide responses to questions of different questions sets of the multiple question sets, wherein the diagnosing comprises:

evaluating responses to the question sets, wherein the evaluating comprises:

automatically counting using an automated scoring mechanism, the number of responses in required fields of a question set of the multiple question sets;

scoring, using the automated scoring mechanism, the question set against a total number of required fields in the question set, wherein the scoring depends on a percentage of required fields present in the question set, thereby producing a numeric value which is an indication of the strength of responses for the question set, the strength of responses indication being an indication of the strength of evidence of the respective root cause of trouble; and producing a numeric value representing the impact of the respective root cause of trouble on the project development management effort based on at least one of impact to schedule or impact to project cost;

wherein evaluating provides guidance regarding an existence of one or more root causes of trouble for the product development effort from the identified multiple root cause of trouble;

plotting each root cause of trouble of the multiple possible root causes of trouble using the produced numeric values in a graph with a first axis representing strength of evidence for the respective root causes of trouble and a second axis representing negative impact of the respective root causes on the product development management effort, wherein the graph is a matrix representing a mix of high and/or low negative impact and strength of evidence; and assessing, based at least in part on the graph, the product development management effort by identifying a possible root cause of trouble of the multiple possible root causes of trouble in a particular region of the matrix representing a high negative impact on the product development management effort and a high strength of evidence in support of the presence of the root cause of trouble;

wherein diagnosing provides guidance regarding effectiveness of implementation of project management processes employed for the product development management effort.

12. The at least one program storage device of claim 11, wherein the method further comprises evaluating project management processes employed for the product development management effort by comparison thereof to identified, standard project management processes, and providing guidance regarding effectiveness of implementation of the project management processes employed for the product development management effort.

13. The at least one program storage device of claim 12, wherein the method further comprises evaluating project management work product of the product development management effort and providing work product assessment as further evidence of the existence one or more root causes of trouble for the product development management effort or the effectiveness of implementation of the project management processes employed for the product development management effort.

14. The at least one program storage device of claim 11, wherein the product development management effort comprises one of a management effort for a software development project or a management effort for a hardware development project.

* * * * *